United States Patent [19]

Kenny et al.

[11] Patent Number: 5,734,850
[45] Date of Patent: Mar. 31, 1998

[54] TRANSPARENT BRIDGE BETWEEN OF A COMPUTER SYSTEM AND A METHOD OF INTERFACING THE BUSES TO OPERATE AS A SINGLE LOGICAL BUS

[75] Inventors: John D. Kenny, Sunnyvale; Pranay D. Shah, San Jose, both of Calif.

[73] Assignee: National Semiconductor Corporation, Santa Clara, Calif.

[21] Appl. No.: 498,240

[22] Filed: Jul. 5, 1995

[51] Int. Cl.$^6$ .............................. G06F 13/00; G06F 13/38
[52] U.S. Cl. ........................................ 395/309; 395/308
[58] Field of Search ................................. 395/309, 308, 395/306, 280, 822; 370/85.1, 85.13

[56] References Cited

U.S. PATENT DOCUMENTS

| | | | |
|---|---|---|---|
| 5,309,568 | 5/1994 | Ghosh et al. | 395/309 |
| 5,345,566 | 9/1994 | Tanji et al. | 395/308 |
| 5,448,565 | 9/1995 | Chang et al. | 370/85.13 |
| 5,455,915 | 10/1995 | Coke | 395/293 |
| 5,467,295 | 11/1995 | Young et al. | 395/200.05 |
| 5,522,050 | 5/1996 | Amini et al. | 395/306 |
| 5,546,546 | 8/1996 | Bell et al. | 395/292 |
| 5,550,990 | 8/1996 | Keener et al. | 395/309 |
| 5,557,758 | 9/1996 | Bland et al. | 395/308 |

*Primary Examiner*—Gopal C. Ray
*Attorney, Agent, or Firm*—Limbach & Limbach L.L.P.

[57] ABSTRACT

A bridge and a method for interfacing a plurality of buses with the bridge provides electrical isolation between the buses but is transparent so that the plurality of buses is viewed by software as a single logical bridge. Transaction cycles initiated on one bus are reflected on the other bus. A speculative start of a transaction cycle on a secondary bus immediately after the transaction cycle has been started on the first bus provides a significant savings in time to complete transactions in which the target of the transaction is on the secondary bus.

11 Claims, 9 Drawing Sheets

TRANSPARENT BRIDGE BETWEEN OF A COMPUTER SYSTEM AND A METHOD OF INTERFACING THE BUSES TO OPERATE AS A SINGLE LOGICAL BUS

BACKGROUND OF THE INVENTION

1. Field of the Invention

The present invention relates to the field of computer systems and more particularly, to the interface between plural buses in a system.

2. Description of Related Art

Modern computer systems typically contain multiple buses, electrical pathways over which components of the system communicate with each other. Examples of such buses are the industry standard architecture (ISA) bus, the extended industry standard architecture (EISA) bus, and the peripheral component interface (PCI) bus. In order to provide interconnectivity between the separate buses, a "bridge" is coupled between the buses and provides a translation between the bus cycles of one bus to that of the other bus.

An example of a system in which a plurality of buses are used is a "notebook" computer and a docking station. A notebook computer is a smaller, readily portable computer. The notebook computer can be coupled to the docking station, which provides extended functionality and thereby expands the capability of the notebook computer. The docking station contains a bus on which additional devices reside which can then be operated by the notebook. Exemplary devices include a CD-ROM drive, graphics controllers, etc.

A simple way of interfacing the bus in the notebook with the bus in the docking station would be to connect the notebook bus directly to the docking station bus. However, simply extending a bus from the notebook into the docking station may violate electrical specifications. For example, if the bus in the notebook is a PCI bus, an extension of the PCI bus into the docking station would violate the loading specification of the PCI bus. In order to comply with the PCI loading specification, a bridge must be coupled between the two buses. Coupling the bridge between the two buses is also advantageous for docking.

The presence of two different PCI buses in the system when the notebook is docked at the docking station presents complications in the configuring of devices. When the power is started on a typical notebook, there is a BIOS in the notebook which physically takes control and configures all the devices coupled to the bus in the notebook. Once the BIOS system completes its configuration of the devices in the notebook, the control may be passed to a WINDOWS operating system. The WINDOWS software is also designed to configure devices, but only on a single bus. Both from the BIOS point of view and the WINDOWS point of view, the devices are configured on a single bus, this bus being recorded as bus 0. "Bus 0" is normally considered the bus closest to the central processing unit (CPU). The devices on bus 0 are accessed using PCI configuration cycles. These configuration cycles are therefore called type 0 configuration cycles. Once a notebook is docked, however, a second bus is introduced into the system. This additional bus (located in the docking station) becomes bus 1, the bus further away from the CPU.

Since there are now two buses in the system, there are changes in the BIOS code. The BIOS is able to handle the configuration of the devices on bus 1, as well as bus 0. However, the WINDOWS software is not designed to identify devices on bus 1. Instead, it can only configure devices which are on bus 0. Hence, WINDOWS leaves the BIOS to do the configuration for devices on bus 1. Since the WINDOWS software does not do the configuration, the so-called "plug and play" feature is not available. Hence, if there are any conflicts on the device, such as two devices on the bus with the same address, the WINDOWS software is not able to change the addresses of one of the devices so that it will not conflict, as it would be able to do if the plug and play feature were available.

SUMMARY OF THE INVENTION

There is a need for a bridge which provides electrical isolation between buses to comply with bus specifications, but allows two connected buses to be viewed from the software as a single logical bus.

This and other needs are met by the present invention which provides a transparent bridge coupled between the first and second buses of a system, this bridge comprising a data path connected between the first and second buses for data and address communication. The bridge also includes a bus interface unit for controlling communications through the bridge. The bus interface unit monitors bus cycles on the first and second buses. The bus cycles generated on either the first or the second bus are reflected to the other of the buses. Thus, the bridge is transparent so that devices on the first and second buses are addressable as on a single logical bus.

Since the devices on the first and second buses are addressable as if they were on a single logical bus, WINDOWS software is able to do the configuration for all of the devices. This permits the plug and play capabilities to be utilized. Furthermore, WINDOWS software is able to resolve any conflicts on the bus since it would be aware of all of the addresses of the devices on the buses, as each of the devices is treated as being on a single bus.

Another aspect of the invention satisfies the above-stated needs by providing an arrangement comprising a computer system having a first bus with first devices connected to the first bus. The arrangement also includes a digital data system having a second bus with second devices coupled to the second bus. A bridge is coupled between the first and second buses to allow data transfers between the first and second devices. A bridge monitors the bus cycles on the first and second buses and reflects the bus cycles generated on the first and second buses to the other of the buses. Thus, the bridge is transparent so that devices on the first and second buses are addressable as on a single logical bus. In certain preferred embodiments, the computer system is a notebook computer, while the digital data system is a docking station. In other embodiments, both the computer system and the digital data system are within a desktop system.

A still further aspect of the present invention provides a method of bridging first and second buses in a computer system such that the buses form a single logical bus, with each bus having devices coupled thereto. The method comprises the steps of speculatively starting a transaction cycle on the second bus after a transaction cycle of bus transactions has started on the first bus. The bus transactions occurring on the first bus are reflected onto the second bus, and the bus transactions occurring on the second bus are reflected onto to the first bus. The bus transaction is allowed to occur on the first and second buses when either: one of the devices on the first bus claims the transaction cycle within a first defined number of bus cycles after the transaction cycle is started on the first bus; or one of the devices on the second bus claims the transaction cycle within a second defined number of bus cycles after the starting of the transaction cycle on the second bus. The transaction cycle is claimed by the bridge when no device on the first or second buses has claimed the transaction cycle within the first defined number of bus cycles after the transaction cycle is started on the first bus. If the transaction cycle has been claimed by the bridge, the transaction cycles on the first and second buses are aborted if none of the devices on the second bus have claimed the transaction cycle within the second defined number of bus cycles after the starting of the transaction cycle on the second bus.

The speculative starting of a transaction cycle on a second bus after the transaction cycle has been started on the first bus provides a savings in the number of bus cycles needed to perform the different types of transactions, such as read, write or configuration transactions. The savings are realized since the start of a cycle is sent immediately over the second bus, without waiting for devices on the first bus to claim the cycle. The method of the present invention takes the appropriate steps necessary to conform the buses to the PCI specification and timing requirements by tentatively claiming the transaction cycle prior to the master abort on the first bus. This allows a slower device on the second bus to claim the transaction cycle. If no device on the second bus claims the transaction cycle after the bridge has claimed the transaction cycle, the bridge merely performs a target abort on the first bus in order to cancel the transaction cycle.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
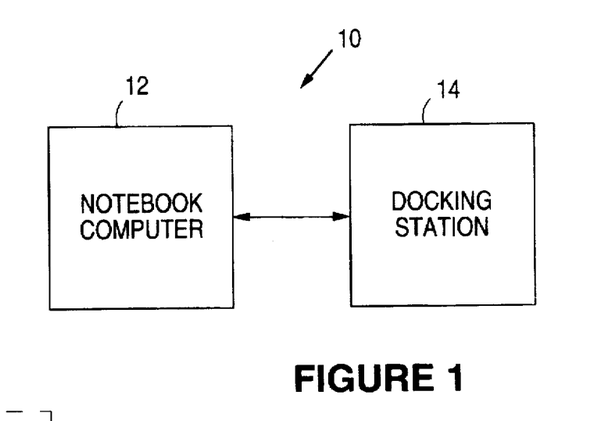
FIG. 1 is a block diagram of a computer system having a notebook and a docking station.

FIG. 1 is a block diagram of an exemplary embodiment of a computer system in which the bridge of the present invention is used. However, the arrangement and method of the present invention may be used in other types of computer systems in which two buses are coupled together by a bridge. The computer system 10 of FIG. 1 includes a notebook computer 12 and a docking station 14. The notebook computer 12 is a portable computer and can be any of a number of different types of commercially available notebook computers. Similarly, the docking station 14 can also be a commercially available docking station, but provided with the bridge of the present invention.

Figure 2:
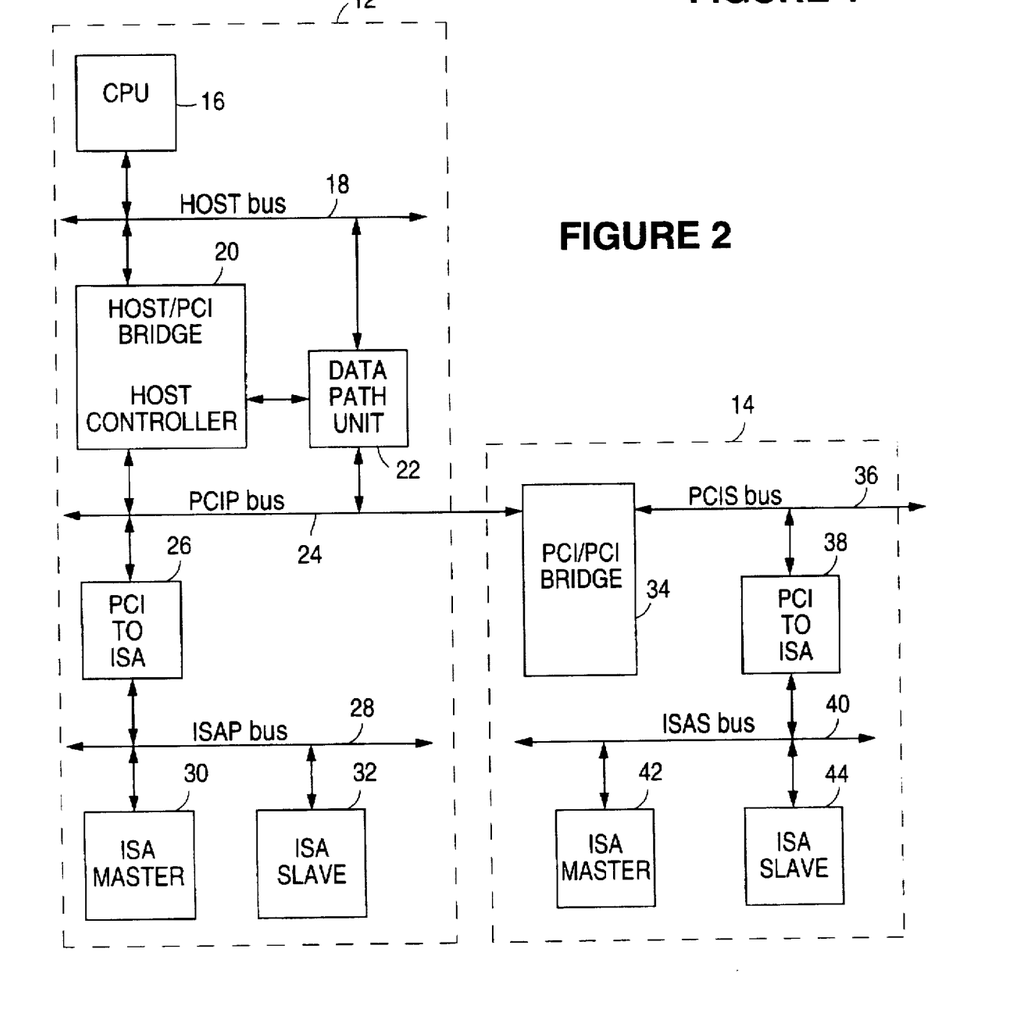
FIG. 2 is a block diagram of a notebook and a docking station constructed in accordance with an embodiment of the present invention.

FIG. 2 is a block diagram depicting the notebook computer 12 and the docking station 14 in more detail. Notebook computer 12 comprises a central processing unit (CPU) 16 coupled via a host bus 18 to a host controller 20 and a data path unit 22. The host controller 20 is a host/PCI bridge.

The host controller 20 and the data path unit 22 are coupled to a PCI bus 24. For purposes of this description, the devices and the buses in the notebook computer 12 are referred to as "primary" buses or devices, while those devices and buses in the docking station 14 are referred to as "secondary" buses or devices. The suffix "p" or "s" respectively denotes the primary or secondary designation.

The primary PCI bus 24 is coupled to an industry standard architecture (ISA) bus 28 via a PCI to ISA bridge. A number of devices are connected to the ISA bus 28, such as the ISA master 30 and ISA slave 32.

The docking station 14 in the illustrative embodiment contains a PCI to PCI bridge 34 according to the present invention and a PCI bus 36, which is the secondary PCI bus in this embodiment. A super I/O (PCI/ISA bridge) 38 bridges the secondary PCI bus 36 to a secondary ISA bus 40. Secondary ISA master 42 and secondary ISA slave 44 are coupled to this secondary ISA bus 40.

Although the PCI to PCI bridge 34 is depicted as comprising part of the docking station 14, it may also be mounted instead in the notebook computer 12.

"Downstream" transactions are those forwarded from the primary side of the PCI to PCI bridge 34 to the secondary side, while "upstream" transactions are forwarded from the secondary side of the PCI to PCI bridge 34 to the primary side. Transactions may occur over both of the PCI buses 24, 36 between an initiator and a target, but the PCI protocol and timing specifications must still be met.

In a standard, single PCI bus, a typical transaction cycle is as follows: a FRAME# signal is asserted on the bus (goes low), alerting the devices on the bus that a transaction cycle has begun. The initiator of the transaction will assert the IRDY# signal to indicate its readiness to perform the transaction. Address information asserted on the bus is decoded by the devices on the bus to identify whether the particular device is being addressed (targeted) for a transaction. Command signals (as well as the address information) are also sent out at the same time as the FRAME# signal to determine whether it is a read or a write transaction, or a configuration cycle. A target device responds by acknowledging that it is a target through assertion of the DEVSEL# signal on the bus.

If the target is a fast decode target, it will respond with the DEVSEL# signal the first bus cycle after the FRAME# signal has been asserted. A medium decode target responds in the second bus cycle after the FRAME# signal has been asserted, while a slow decode target responds in the third bus cycle after the FRAME# cycle has been asserted. Certain devices, known as subtractive decode devices, may respond in the fourth cycle after the FRAME# signal has been asserted.

If no device has responded by the fifth cycle after the FRAME# signal has been asserted, a master abort of the transaction cycle is performed.

In known PCI to PCI bridges, when the target is on the secondary bus, an address register must be programmed to allow the bridge itself to claim the transaction cycle for the targets on the secondary bus by asserting the DEVSEL# signal on the primary bus prior to the master abort from the primary bus. After claiming the cycle, the bridge then asserts the FRAME# signal on the secondary bus and the transaction is then allowed to occur.

The first problem is the need to program address values. The second problem with this approach is the amount of time it takes for a single transaction cycle to complete. This is due to the sending of the FRAME# signal by the bridge over the secondary bus three cycles after the FRAME# was first asserted on the primary bus. This partially nullifies the advantages of speed provided by the PCI bus architecture.

Instead of decoding the address with a bridge every time the FRAME# is asserted on the primary bus, and then sending out the FRAME# signal on the secondary bus some time thereafter, the bridge 34 of the present invention immediately asserts a speculative FRAME# on the secondary bus 36. By asserting the FRAME# signal on the secondary bus 36 in the next cycle after the FRAME# has been asserted on the primary bus 24, the speed of each transaction cycle may be increased by two to six bus cycles, representing significant savings.

Figure 4:
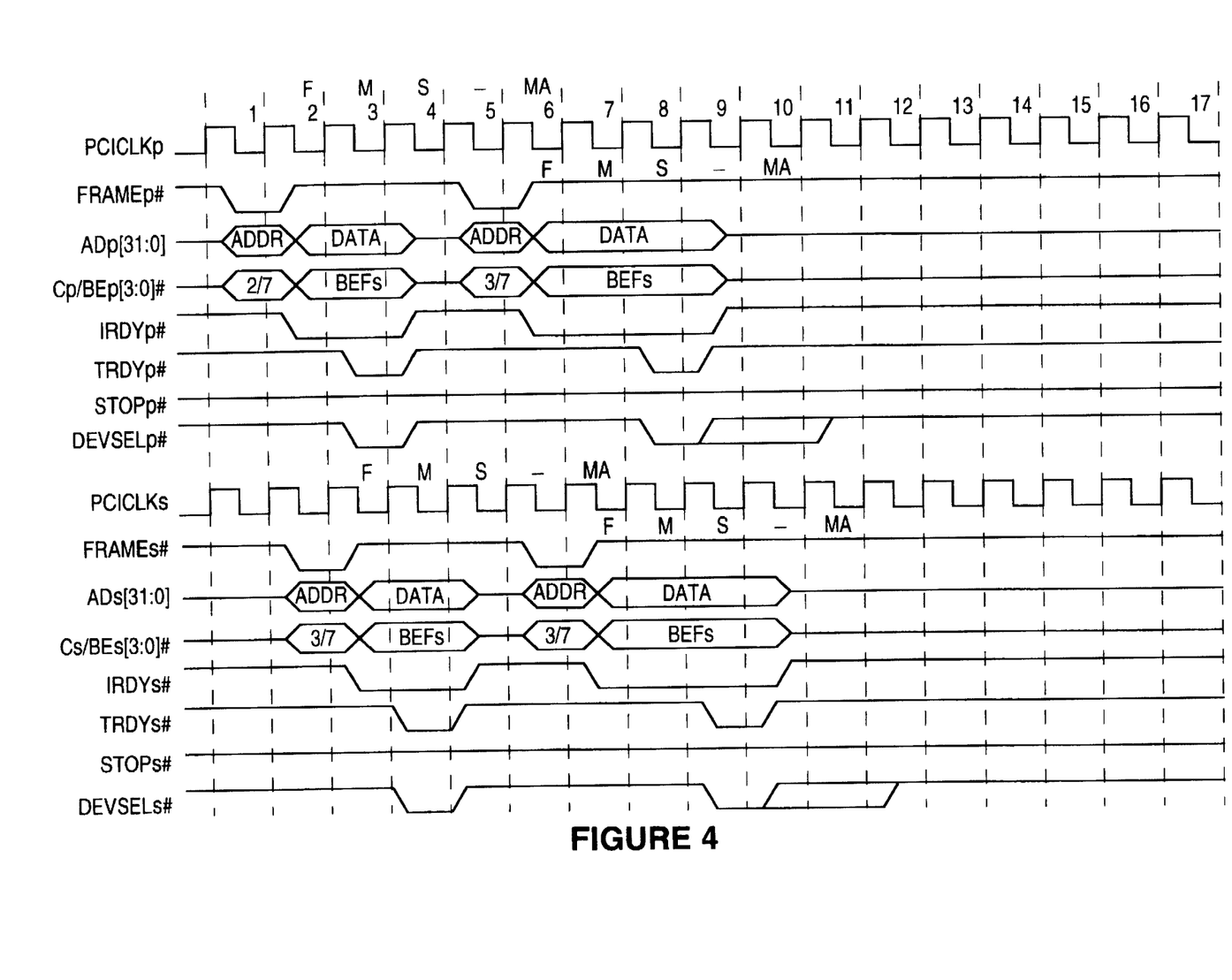
FIG. 4 is a timing diagram illustrating the method of the present invention for an I/O/memory write in which the initiator is on a primary bus, and the target is on a primary bus.

FIGS. 4–7 are timing diagrams of different transaction cycles as they are carried out according to the present invention. FIG. 4 depicts two separate transaction cycles where the initiator is on the primary bus 24 and .the target is also on the primary bus 24. These transaction cycles are I/O memory write cycles. The first transaction cycle is terminated by a medium decode target on the primary bus 24, while the second transaction cycle is terminated by a slow decode target on the primary bus 24. For the first transaction cycle, the FRAME# is asserted in bus cycle 1. Rather than decoding the address which accompanies the assertion of the FRAME# signal in bus cycle 1, the PCI to PCI bridge 34 of the present invention immediately sends a speculative FRAME# signal on the secondary bus 36. The assertion of the speculative FRAME# signal therefore occurs in bus cycle 2 while the signals asserted on the primary bus 24 will now be "reflected" on the secondary bus 36.

Since the target is a medium decode target on the primary bus 24, the target (after decoding the address and determining that it is the target of the transaction cycle) asserts the DEVSEL# signal on the primary bus 24, acknowledging that it has recognized that it is the target of the transaction cycle. The target also asserts the TRDY# signal to indicate its readiness to perform the indicated transaction. The initiator ready (IRDY#) signal has been asserted by the initiator to indicate its readiness for performing the transaction. The desired transaction occurs when both the IRDY# and TRDY# signals are asserted.

The second transaction cycle in FIG. 4 involves a slow decode target, such as ISA slave 32, that claims the transaction cycle, but is otherwise the same as the first transaction cycle. As in the first transaction cycle, all of the signals carried on the primary bus 24 are reflected on to the secondary bus 36 by the transparent PCI to PCI bridge 34.

A read cycle is similar to the write cycle of FIG. 4, except that the data is separated from the address by one or more bus cycles to allow the bus to "turn around" to permit reading of data after sending the address.

Figure 5:
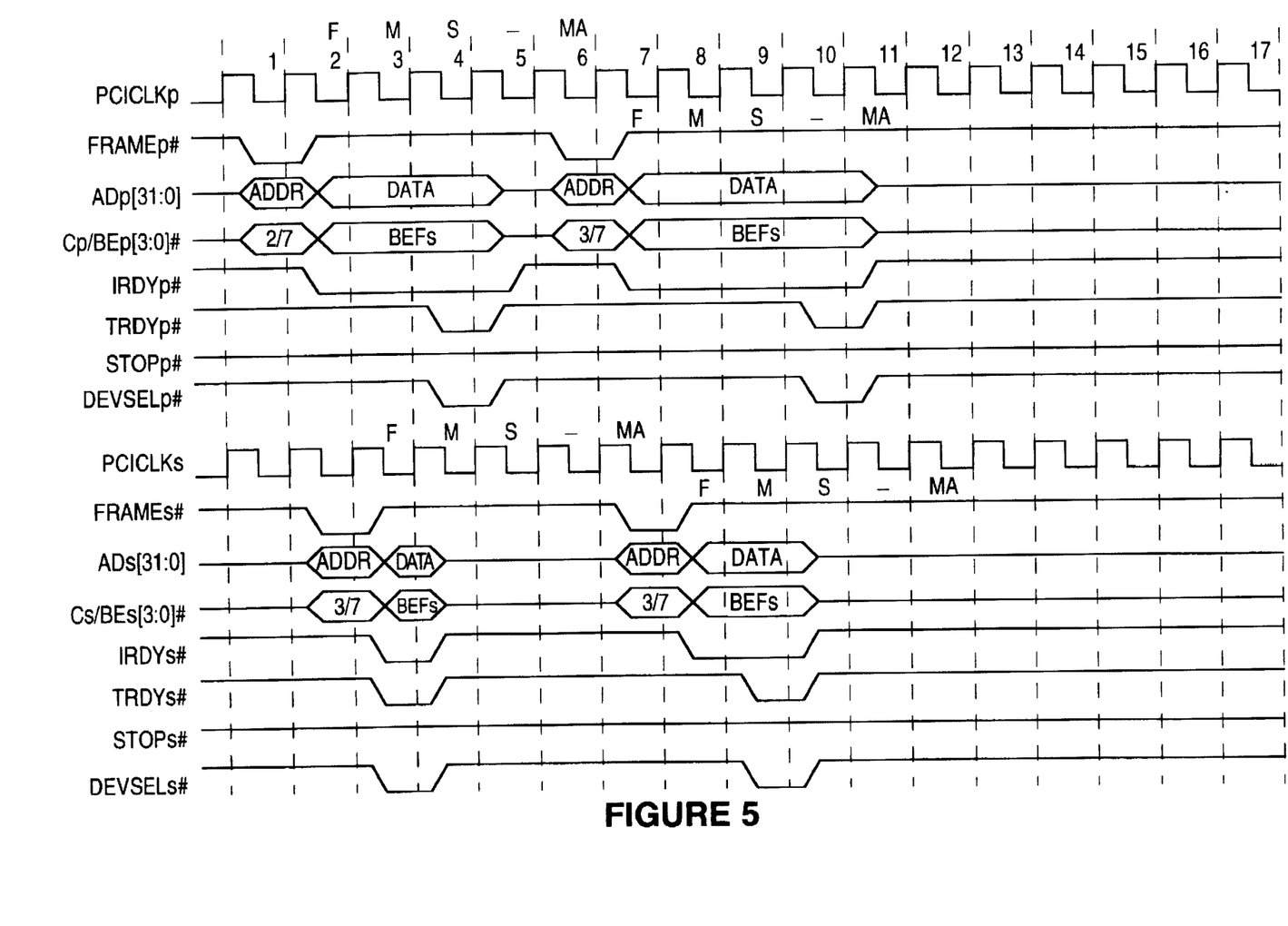
FIG. 5 is a timing diagram according to the method of the present invention of a I/O/memory write transaction in which the initiator is on the primary bus and the target is on the secondary bus.

An example of a transaction cycle in which the initiator is on the primary bus 24, but the target is on the secondary bus 36, is provided in FIG. 5. This transaction cycle is an I/O memory write cycle. It is a "downstream" cycle since the initiator is on the primary bus 24 and the target is on the secondary bus 36.

The first transaction cycle begins in bus cycle 1 by the assertion of the FRAME# signal on the primary bus 24. The PCI to PCI bridge 34 immediately asserts a speculative FRAME# signal on the secondary bus 36 in bus cycle 2. A fast decode target on the secondary bus 36 claims the transaction cycle during bus cycle 3 by asserting the DEVSEL# signal. The transaction is performed when the target asserts its TRDY# signal. The DEVSEL# and TRDY# signals are reflected onto the primary bus 24, as seen in bus cycle 4.

With the transparent bridge 34 and the assertion of a speculative FRAME#, the present invention provides a significant savings in the amount of bus cycles needed to complete a transaction cycle occurring over two different buses.

A second transaction cycle is also depicted in FIG. 5 in which the target on the secondary bus 36 is a medium decode target. In this case, the DEVSEL# signal is eventually asserted on the primary bus 24 in the fourth bus cycle after the FRAME# was initially asserted on the primary bus 24. This is prior to the master abort of the transaction cycle which would otherwise occur if the DEVSEL# signal had not been asserted on the primary bus 24 by the fifth bus cycle after the assertion of the FRAME# on the primary bus 24.

Figure 6:
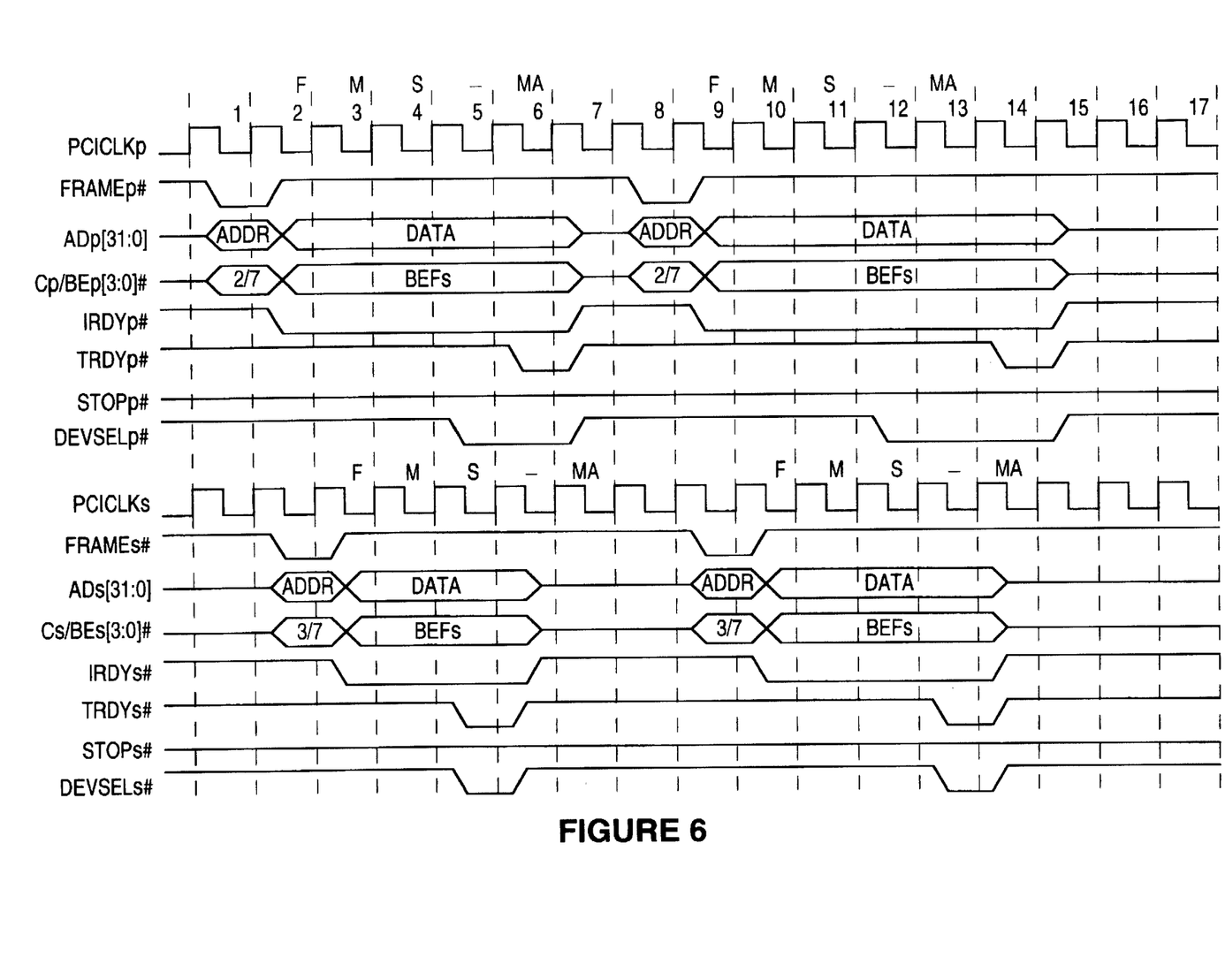
FIG. 6 is a timing diagram according to the method of the present invention of a I/O/memory write transaction where the initiator is on the primary bus, and the target is on the secondary bus, and is a subtractive decode device.

FIG. 6 is a timing diagram depicting an I/O memory write cycle in which the initiator is on the primary bus 24, and the target is on the secondary bus 36. In this case, however, the target of the first transaction cycle is a slow decode target on the secondary bus 36 and the target of the second transaction cycle is a subtractive decode target on the secondary bus 36. In both instances, a reflection of the DEVSEL# signal generated on the secondary bus to the primary bus 24 would not be early enough (i.e., before bus cycle 6 or bus cycle 13) to prevent a master abort from occurring on the primary bus 24. In order to allow the use of slow decode targets and subtractive decode targets on the secondary bus, the present invention provides for the PCI to PCI bridge 34 to tentatively claim the transaction cycle as a subtractive decode device on the primary bus 24 (during bus cycle 5 and bus cycle 12), for example, by the assertion of the DEVSEL# signal on the primary bus 24. As in the timing diagrams of FIGS. 4 and 5, the speculative FRAME# has been asserted on the secondary bus 36 in bus cycle 2. For the first transaction cycle, the slow decode target on the secondary bus claims the transaction cycle in the third bus cycle after the assertion of the FRAME# signal on the secondary bus 36 (i.e., bus cycle 5). Once the PCI to PCI bridge 34 has claimed a cycle, it reflects all further signals onto the primary bus 24 from the secondary bus 36. The transaction cycle is completed in bus cycle 6 and a new transaction cycle is initiated on the primary bus 24 at bus cycle 8 with the assertion of the FRAME# signal on the primary bus 24.

In the second transaction cycle in FIG. 6, the target on the secondary bus 36 is a subtractive decode target. Accordingly, the subtractive decode target asserts the DEVSEL# signal four bus cycles after the assertion of the FRAME# signal on the secondary bus, during bus cycle 13. Although this DEVSEL# signal would only be reflected in bus cycle 14, the claiming of the transaction cycle by the PCI to PCI bridge 34 during bus cycle 12 permits the subtractive decode target on the secondary bus 36 to claim a transaction cycle.

Figure 7:
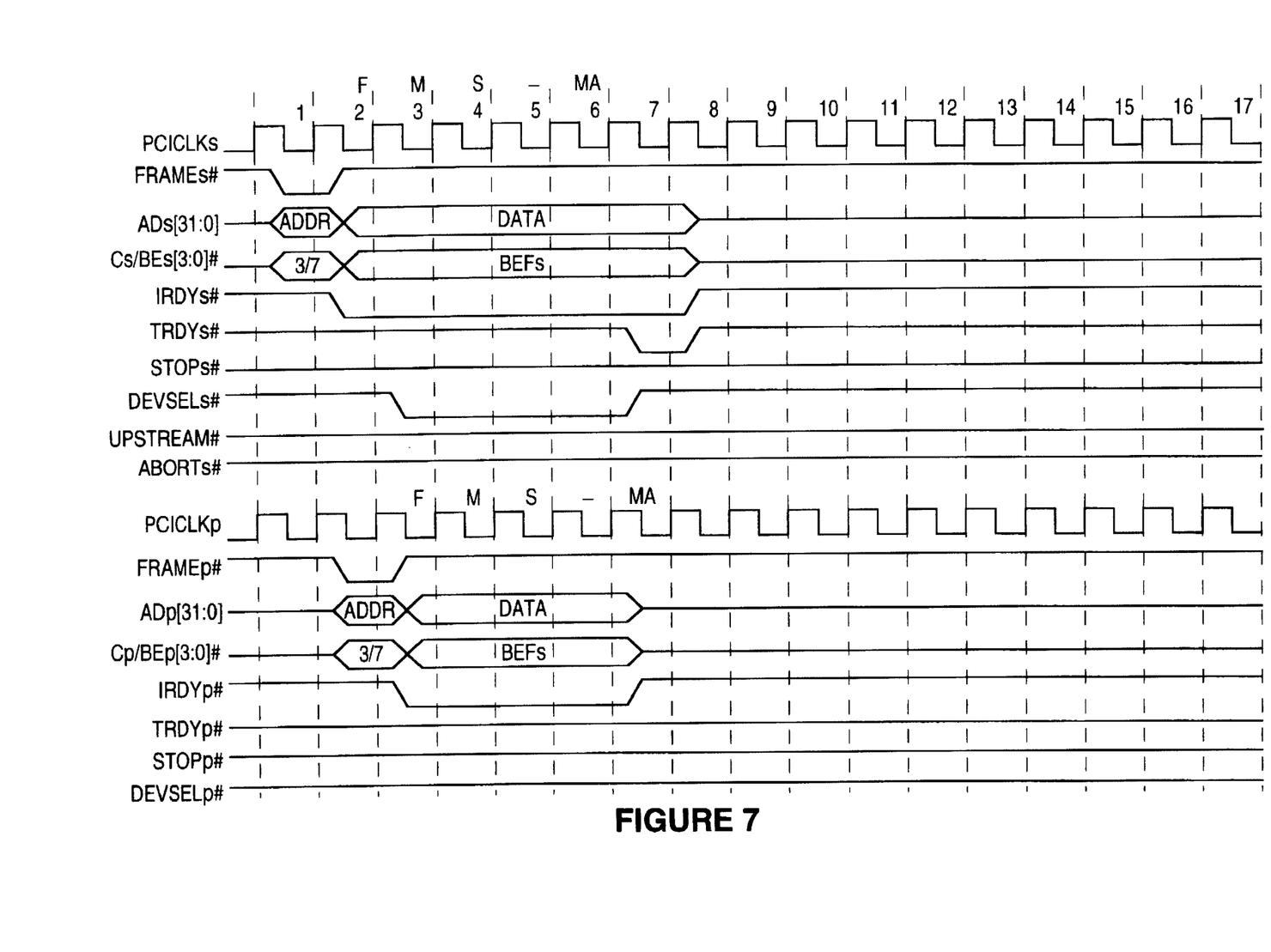
FIG. 7 is an exemplary embodiment of a timing diagram according to the method of the present invention in which the transaction cycle is aborted.

FIG. 7 is a timing diagram that depicts a transaction cycle in which the initiator is on the secondary bus 36, the target is on the primary bus 24, but the device is a non-existing device on the primary bus 24. Since the initiator is on the secondary bus 36 and the intended target is on the primary bus 24, this is an "upstream" transaction. Accordingly, when the FRAME# signal is asserted on the secondary bus 36, (bus cycle 1), the PCI to PCI bridge 34 asserts the speculative FRAME# signal in bus cycle 2 on the primary bus 24. Since the bridge 34 is aware that the intended target is on the primary bus 24, the bridge 34 claims the transaction cycle as a medium decode target (bus cycle 3). The signals on the secondary bus 36 have been reflected onto the primary bus 24. In bus cycle 7, (5 bus cycles after the speculative FRAME# has been asserted on the primary bus 24), a master abort is performed on the primary bus 24 to terminate the transaction cycle. The PCI to PCI bridge 34, upon seeing the master abort on the primary bus 24, performs a target abort to the initiator on the secondary bus 36. This terminates the transaction cycle on the secondary bus 36.

Figure 8:
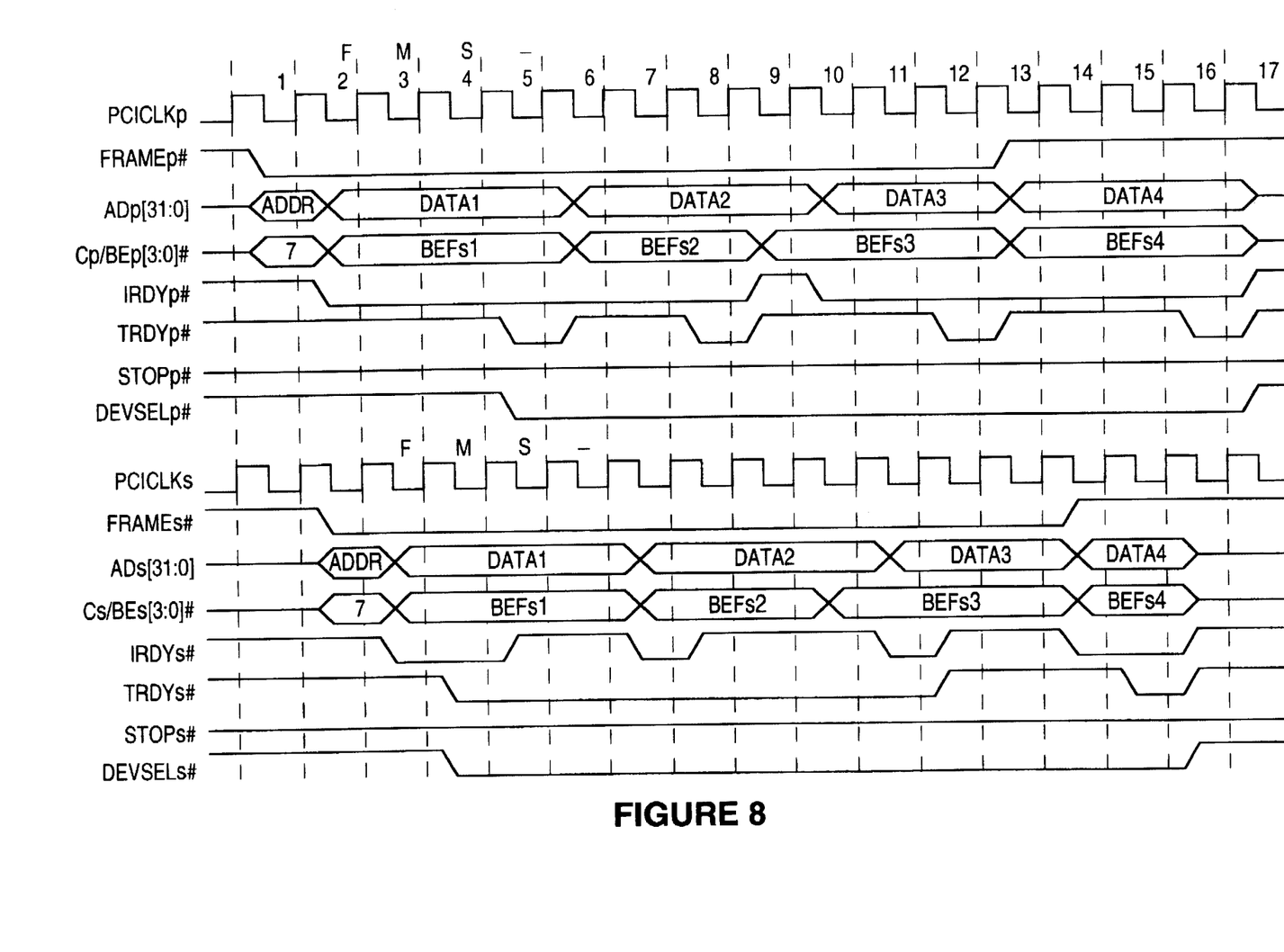
FIG. 8 is an exemplary timing diagram according to the present invention of a downstream memory burst write.

An exemplary timing diagram of a downstream memory burst write in which the initiator is on the primary PCI bus 24 and the target is on the secondary PCI bus 36 is provided in FIG. 8. After the FRAME# signal has been asserted by the initiator on the primary PCI bus 24, the PCI to PCI bridge 34 asserts a speculative start cycle (FRAME#s) in bus cycle 2 on the secondary PCI bus 36. When the PCI to PCI bridge 34 sees the claiming of the cycle by a medium decode target on the secondary PCI bus 36 in bus cycle 4, it forwards part of the cycle as it is on the secondary PCI bus 36 and part of the cycle as it is on the primary PCI bus 24.

The PCI to PCI bridge 34 is able to sustain a burst write latency of 3 clocks with no wait states inserted either by the initiator on the primary PCI bus 24 or by the target on the secondary PCI bus 36. The PCI to PCI bridge 34 itself inserts wait states on the primary PCI bus 24 and the secondary PCI bus 36 during burst cycles to maintain the order of data transfer. An initiator on the primary PCI bus inserts a wait state by de-asserting the IRDYp# signal (bus cycle 9). A target on the secondary PCI bus 36 inserts wait states by de-asserting TRDYs# (bus cycles 12, 13, 14).

Figure 9:
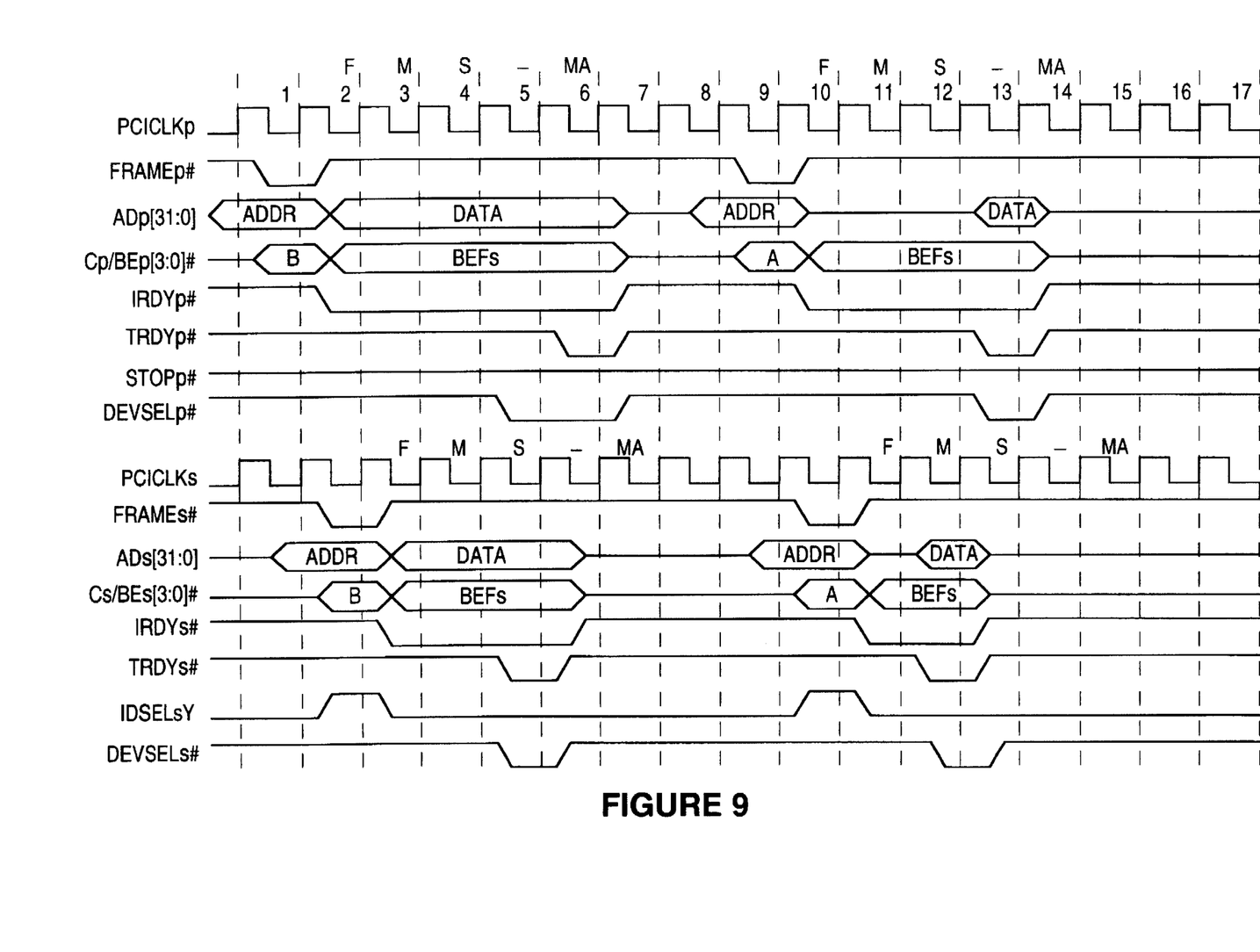
FIG. 9 is a timing diagram according to the present invention of an exemplary configuration write/read performed downstream.

FIG. 9 is a timing diagram of an exemplary configuration write/read performed downstream, so that the initiator is on the primary PCI bus 24 and the target is on the secondary PCI bus 36. Configuration write cycles on the primary PCI bus 24 are forwarded downstream by the PCI to PCI bridge 34 if the signal IDSELsP remains de-asserted. If configuration write cycles are not claimed by any device on the primary PCI bus, then the PCI to PCI bridge 34 claims these cycles on the primary PCI bus 24 as a subtractive decode device. If the forwarded configuration write cycle is not claimed by any device on the secondary bus then the PCI to PCI bridge 34 provides normal termination to the configuration write on the primary PCI bus 24 after master aborting the forwarded configuration write cycles on the secondary PCI bus 36.

Figure 10:
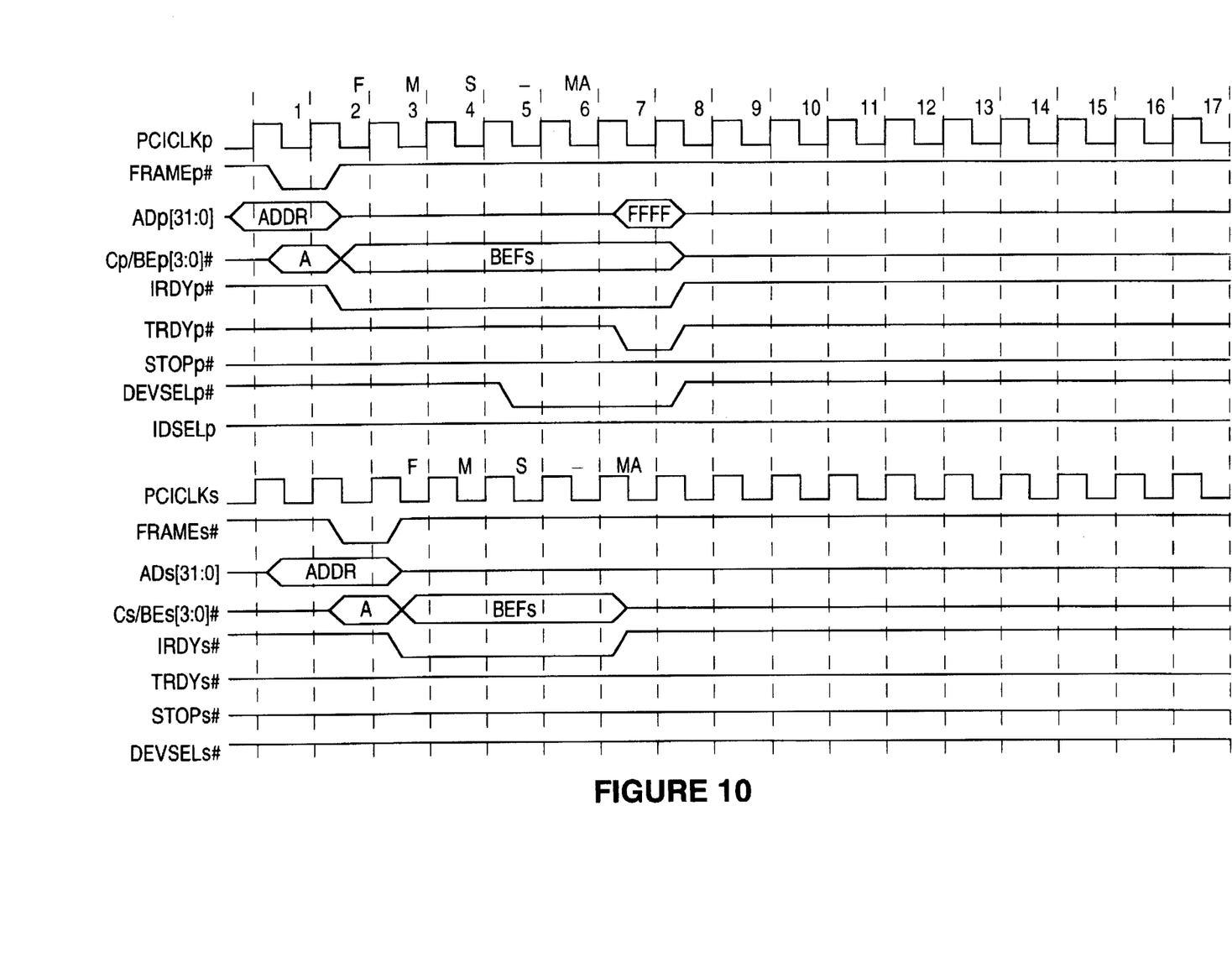
FIG. 10 is a timing diagram according to the present invention of an exemplary configuration read cycle.

FIG. 10 is a timing diagram of an exemplary configuration read cycle in which the initiator is on the primary PCI bus 24 and there is no target. Configuration read cycles on the primary PCI bus 24 are forwarded downstream by the PCI to PCI bridge 34 if the IDSELp signal is not asserted. If configuration read cycles are not claimed by any device on the primary PCI bus 24, the PCI to PCI bridge 34 claims these cycles on the primary PCI bus as a subtractive decode device. If the forwarded configuration read cycle is not claimed by any device on the secondary PCI bus 36, then the PCI to PCI bridge 34 terminates the configuration read cycle by returning FFFFFFFFh to the initiator on the primary PCI bus 24 after master aborting the forwarded configuration read cycles on the secondary PCI bus 36.

The timing of other types of PCI transaction cycles should be apparent to one of ordinary skill in the art since the present invention reflects the signals from one bus to the other bus. Thus, each bus operates in accordance with the PCI protocol and specification. Furthermore, using the speculative FRAME# method of the present invention and the transparent bridge, the two separate PCI buses are viewed as a single logical bus by the software when configuring the system and identifying the devices on the buses. This reduces the overhead for BIOS and OS configuration. It also reduces the OS/BIOS enumeration/configuration incompatabilty risks.

Figure 3:
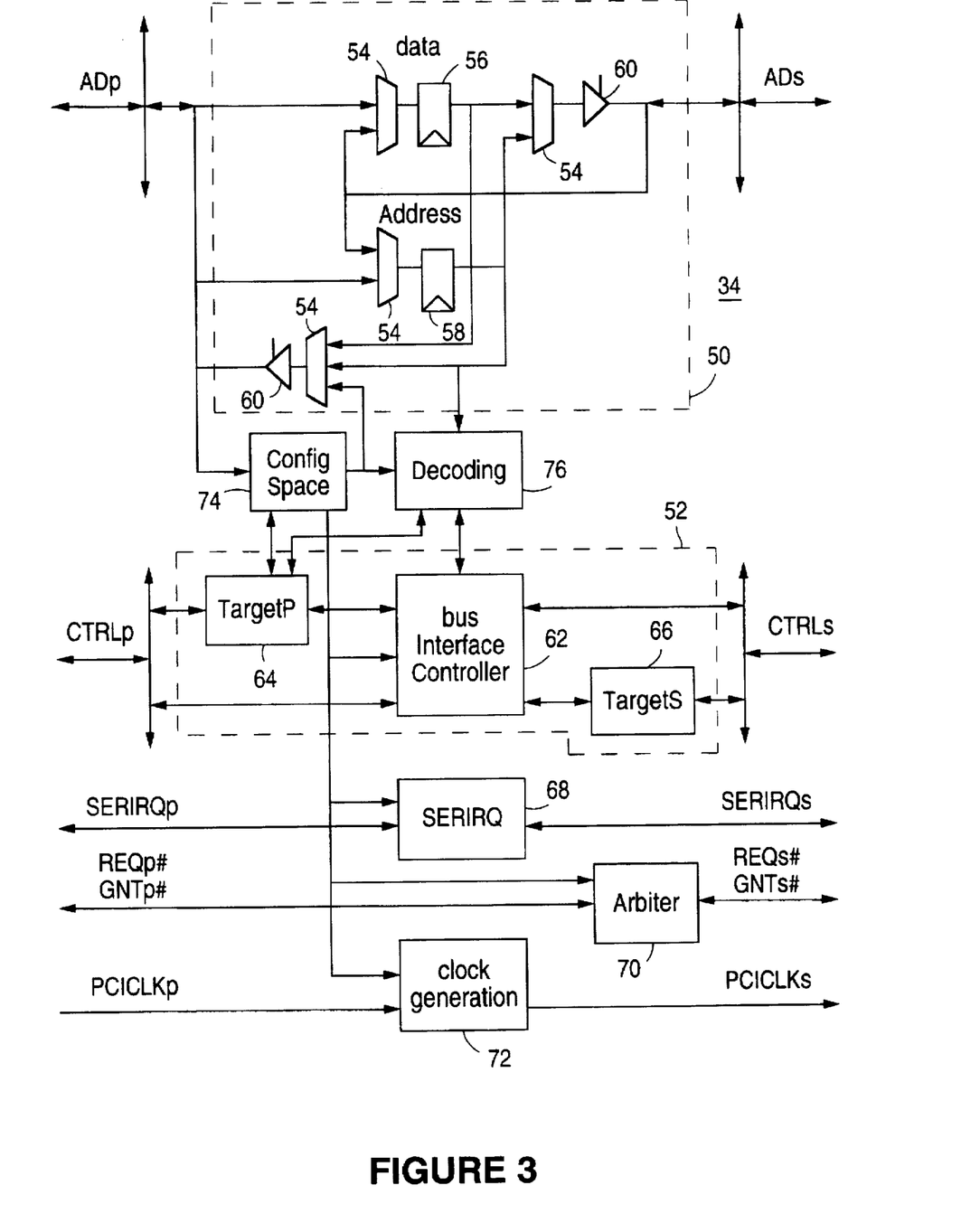
FIG. 3 is a block diagram of a bridge constructed in accordance with an embodiment of the present invention.

FIG. 3 is a block diagram of an exemplary embodiment of the PCI/PCI bridge 34. A data path 50 comprises a plurality of multiplexers 54, a data latch 56 and an address latch 58, and buffers 60. The data path unit provides a pathway for the addresses and data between the primary PCI bus 24 and the secondary PCI bus 36.

The PCI/PCI bridge 34 has a bus interface unit 52 contains a bus interface controller 62 and a primary target 64 and a secondary target 66. Each target 64, 66 is capable of either passing master operations or receiving target operations. The PCI/PCI bridge 34 functions as a target on the initiating bus on behalf of the target that actually resides on the target bus. Likewise, the PCI/PCI bridge 34 functions as a master on the target bus on behalf of the master that actually resides on the initiating bus.

The PCI/PCI bridge 34 allows transactions between a master on one PCI interface to a target on the other interface. The bus interface controller 62 acts as a centralized controller for the bridge 34 and controls the mastering capabilities of the bridge 34 on both the primary PCI bus 24 and the secondary PCI bus 36. The primary target 64 allows configuration register access (to the configuration space 74) and programming through the decoding circuit 76. The secondary target 66 positively decodes upstream cycles.

A secondary bus arbiter 70 provides an arbitration function for the secondary PCI bus 36. The serial interrupt control logic 68 supports serial interrupt request (IRQ) protocol allowing the transfer of interrupt information from the secondary PCI bus 36 to the primary PCI bus 24. The clock generation and reset logic 72 generates and controls the clock and reset for the secondary PCI bus 36. As stated earlier, the PCI/PCI bridge 34 may be located either in the notebook computer 12 or in the docking station 14.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of bridging first and second buses in a computer system, each bus having devices coupled thereto, the method comprising:

speculatively starting a transaction cycle on the second bus after a transaction cycle of bus transactions has started on the first bus;

reflecting bus transactions occurring on the first bus onto the second bus;

reflecting bus transactions occurring on the second bus onto the first bus;

allowing the bus transaction to occur on the first and second buses when either one of the devices on the first bus claims the transaction cycle within a first defined number of bus cycles after the transaction cycle has started on the first bus, or one of the devices on the second bus claims the transaction cycle within a second defined number of bus cycles after the starting of the transaction cycle on the second bus;

claiming the transaction cycle with the bridge when no device on the first or second bases has claimed the transaction cycle within the first defined number of bus cycles after the transaction cycle has started on the first bus; and aborting the transaction cycles on the first and second buses when none of the devices on the second bus have claimed the transaction cycle within the second defined number of bus cycles after the starting of the transaction cycle on the second bus after the transaction cycle has been claimed by the bridge, wherein the step of aborting the transaction cycle includes performing a target abort on the first bus and a master abort on the second bus.

2. The method of claim 1, wherein the first and second buses are PCI buses.

3. The method of claim 1, further comprising the steps of performing burst cycles, and inserting wait states during the burst cycles by de-assertion of a signal indicating readiness of a device to perform the bus transaction.

4. A transparent bridge coupled between first and second buses of a system, the bridge comprising:

a data path connected between the first and second buses for data and address communications through the bridge between the first and second buses; and a bus interface unit for controlling data and address communications through the bridge, the bus interface unit monitoring bus cycles on the first and second buses and reflecting the bus cycles generated on one of the first and second buses to the other of the first and second buses such that devices connected to the first bus and devices connected to the second bus are addressable as on a single logical bus, the bus interface unit having a bus interface controller that speculatively starts a transaction cycle on the second bus after a transaction cycle of bus transactions has started on the first bus, the bus transaction occurring on the first bus being reflected onto the second bus and bus transactions occurring on the second bus being reflected onto the first bus, bus transactions being allowed to occur on the first and second buses when either (i) a device connected to the first bus claims the transaction cycle within a first defined number of bus cycles after the transaction cycle is started on the first bus or (ii) a device connected to the second bus claims the transaction cycle within a second defined number of bus cycles after the starting of the transaction cycle on the second bus.

5. The transparent bridge of claim 4 and wherein the bridge includes means for electrically isolating the first and second buses from each other.

6. The transparent bridge of claim 4 and wherein the transaction cycle is claimed by the transparent bridge when no device connected to the first bus and no device connected to the second bus claims the transaction cycle within the first defined number of bus cycles after the transaction cycle is started on the first bus.

7. The transparent bridge of claim 6 and wherein, in the event that the transaction cycle is claimed by the bridge, transaction cycles on the first and second buses are aborted if no device connected to the second bus claims the transaction cycle within the second defined number of bus cycles after the starting of the transaction cycle on the second bus.

8. A system comprising:

a computer system having a first bus with first bus devices connected to the first bus;

a digital data system having a second bus with second devices connected to the second bus; and a transparent bridge coupled between the first and second buses and having (a) a data path connected between the first and second buses for data and address communications through the bridge between the first and second buses; and (b) a bus interface unit for controlling data and address communications through the bridge, the bus interface unit monitoring bus cycles on the first and second buses and reflecting the bus cycles generated on one of the first and second buses to the other of the first and second buses such that the first devices connected to the first bus and the second devices connected to the second bus are addressable as on a single logical bus, and wherein the bus interface unit having a bus interface controller that speculatively starts a transaction cycle on the second bus after a transaction cycle of bus transactions has started on the first bus, bus transactions occurring on the first bus being reflected onto the second bus and bus transactions occurring on the second bus being reflected onto the first bus, bus transactions being allowed to occur on the first and second buses when either (i) a first device connected to the first bus claims the transaction cycle within a first defined number of bus cycles after the transaction cycle is started on the first bus or (ii) a second device connected to the second bus claims the transaction cycle within a second defined number of bus cycles after the starting of the transaction cycle on the second bus.

9. The system of claim 8, and further comprising a configuration space, disposed within the bridge, that contains a configuration of the first devices connected to the first bus.

10. The system of claim 8 and wherein the transaction cycle is claimed by the transparent bridge when no first device connected to the first bus and no second device connected to the second bus claims the transaction cycle within the first defined number of bus cycles after the transaction cycle is started on the first bus.

11. The system of claim 10 and wherein, in the event that the transaction cycle is claimed by the bridge, transaction cycles on the first and second buses are aborted if no second device claims the transaction cycle within the second defined number of bus cycles after the starting of the transaction cycle on the second bus.

* * * * *

UNITED STATES PATENT AND TRADEMARK OFFICE
CERTIFICATE OF CORRECTION

PATENT NO. : 5,734,850
DATED : March 31, 1998
INVENTOR(S) : John Kenny, et al

It is certified that error appears in the above-indentified patent and that said Letters Patent is hereby corrected as shown below:

On the cover page, item [54] and Column 1, in the title, after "BETWEEN" insert -- BUSES--.

Column 10, line 45, after "8" delete ",".

Signed and Sealed this

Twenty-third Day of June, 1998

*Attest:*

*Attesting Officer*

BRUCE LEHMAN

*Commissioner of Patents and Trademarks*